(12) United States Patent
Mei et al.

(10) Patent No.: US 10,992,685 B2
(45) Date of Patent: Apr. 27, 2021

(54) IDENTITY VERIFICATION

(71) Applicant: Advanced New Technologies Co., Ltd., George Town (KY)

(72) Inventors: Jue Mei, Hangzhou (CN); Xin Chen, Hangzhou (CN); Tong Zhu, Hangzhou (CN); Yiteng Tian, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/811,966

(22) Filed: Mar. 6, 2020

(65) Prior Publication Data
US 2020/0382522 A1    Dec. 3, 2020

Related U.S. Application Data

(63) Continuation of application No. PCT/CN2020/071107, filed on Jan. 9, 2020.

(30) Foreign Application Priority Data

May 31, 2019 (CN) .......................... 201910470157.3

(51) Int. Cl.
*H04L 29/06* (2006.01)
*G06F 21/31* (2013.01)
*H04W 4/029* (2018.01)

(52) U.S. Cl.
CPC .......... *H04L 63/126* (2013.01); *G06F 21/316* (2013.01); *H04W 4/029* (2018.02); *G06F 2221/2113* (2013.01); *H04L 2463/082* (2013.01)

(58) Field of Classification Search
CPC .......... H04L 63/126; H04L 2463/082; H04W 4/029; G06F 21/316; G06F 2221/2113
See application file for complete search history.

(56) References Cited

U.S. PATENT DOCUMENTS 8,214,650 B2 * 7/2012 Dickinson .......... G06Q 20/4016
    713/182
8,301,876 B2 * 10/2012 Burch .................... H04L 63/08
    705/75

(Continued)

FOREIGN PATENT DOCUMENTS

CN    105279650    1/2016
CN    108256853    7/2018

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Ghodrat Jamshidi
(74) *Attorney, Agent, or Firm* — Fish & Richardson P.C.

(57) ABSTRACT

This disclosure relates to identity verification. In one aspect, a method includes obtaining verification information during a user application session of a user with an application component subsequent to a verification triggering request to perform identity verification on the user. A determination is made whether the verification information satisfies a first identity verification-free condition. When the verification information satisfies the first identity verification-free condition, an identity verification-free operation that does not include identity verification of the user is performed. When the verification information fails to satisfy the first identity verification-free condition, an identity verification process is performed to verify an identity of the user.

20 Claims, 2 Drawing Sheets

(56) References Cited

U.S. PATENT DOCUMENTS

| | | | | |
|---|---|---|---|---|
| 8,689,294 | B1* | 4/2014 | Thakur | H04L 63/08 |
| | | | | 713/182 |
| 9,223,955 | B2* | 12/2015 | Lymberopoulos | ......................... |
| | | | | G06K 9/00382 |
| 9,438,604 | B1* | 9/2016 | Addala | H04L 63/10 |
| 9,514,294 | B1* | 12/2016 | Hepburn | H04L 9/3226 |
| 10,110,601 | B1 | 10/2018 | Jakobsson | |
| 10,404,941 | B1* | 9/2019 | Clements | H04N 7/147 |
| 2007/0294540 | A1* | 12/2007 | Wadayama | G07C 9/257 |
| | | | | 713/186 |
| 2012/0324556 | A1* | 12/2012 | Yefimov | H04W 4/00 |
| | | | | 726/7 |
| 2013/0340028 | A1* | 12/2013 | Rajagopal | H04L 63/08 |
| | | | | 726/1 |
| 2014/0189807 | A1 | 7/2014 | Cahill | |
| 2015/0302411 | A1* | 10/2015 | Bondesen | G06Q 20/20 |
| | | | | 705/72 |
| 2016/0316365 | A1 | 10/2016 | Buhler | |
| 2017/0272427 | A1* | 9/2017 | Robison | H04L 63/0853 |
| 2019/0260742 | A1* | 8/2019 | Arora | H04W 12/06 |
| 2019/0268156 | A1* | 8/2019 | Delmas | H04L 9/0844 |
| 2019/0286815 | A1* | 9/2019 | Sugaya | G06F 21/554 |
| 2020/0162515 | A1* | 5/2020 | Dubinsky | H04L 63/08 |

FOREIGN PATENT DOCUMENTS

| | | |
|---|---|---|
| CN | 108875327 | 11/2018 |
| CN | 110348188 | 10/2019 |
| KR | 20190012026 | 2/2019 |
| TW | 201805887 | 2/2018 |
| TW | 201820194 | 6/2018 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071107, dated Mar. 20, 2020, 19 pages (with machine translation).

* cited by examiner

IDENTITY VERIFICATION

CROSS-REFERENCE TO RELATED APPLICATIONS

This application is a continuation of PCT Application No. PCT/CN2020/071107, filed on Jan. 9, 2020, which claims priority to Chinese Patent Application No. 201910470157.3, filed on May 31, 2019, and each application is hereby incorporated by reference in its entirety.

TECHNICAL FIELD

The present disclosure relates to the field of information technologies, and in particular, to identity verification.

BACKGROUND

As a way of user identity authentication, identity verification is widely used in various Internet services. For example, to determine whether a current operation is performed by an account owner in scenarios such as login, password change, mobile number binding change, payment, and withdrawal on an application, identity verification can be performed at the scale of hundred millions to ensure account security. Identity verifications are usually independent of each other in different application scenarios in existing technologies. Therefore, multiple identity verifications need to be performed on a user when the user performs multiple operations involving high security. Although the series of identity verification methods can ensure account security to a relatively great extent, user experience greatly decreases because of complex identity verification operations, thereby reducing user stickiness and causing user loss.

SUMMARY

An objective of the present disclosure is to provide identity verification methods and apparatuses, so as to alleviate a problem in identifying why a user interrupts a transaction based on user behavior data.

According to a first aspect of the present disclosure, an identity verification method is provided, and the method includes the following: obtaining verification information during a session of a user in response to a verification triggering request; and analyzing whether the verification information satisfies a first identity verification-free condition based on a predetermined identity verification rule, to determine whether to perform an identity verification-free operation on the user.

Further, according to the method in the first aspect of the present disclosure, the determining whether to perform an identity verification-free operation on the user includes the following: if it is determined that the verification information satisfies the first identity verification-free condition based on the predetermined identity verification rule, inputting the verification information to a feasibility prediction model for calculation, and outputting indication data indicating whether to perform an identity verification operation on the user; and if it is determined that the verification information satisfies a second identity verification-free condition based on the indication data, performing an identity verification-free operation on the user.

Further, according to the method in the first aspect of the present disclosure, the verification information includes at least one of identity verification record information, environment information of an operating device, and user operation behavior sequence information during the session.

Further, according to the method in the first aspect of the present disclosure, the analyzing whether the verification information satisfies a first identity verification-free condition based on a predetermined identity verification rule includes at least one of the following: analyzing whether the verification information hits a not-the-same-person operation condition in the predetermined identity verification rule; and if no, determining that the first identity verification-free condition is satisfied; and analyzing whether the verification information hits a high risk operation condition in the predetermined identity verification rule; and if no, determine that the first identity verification-free condition is satisfied.

Further, according to the method in the first aspect of the present disclosure, the method further includes the following: determining whether identity verification has been performed during the session in response to the verification triggering request; and if yes, performing the step of obtaining verification information during a session of a user; or if no, performing an identity verification operation on the user based on a predetermined identity verification method.

Further, according to the method in the first aspect of the present disclosure, the determining whether to perform an identity verification-free operation on the user includes the following: if it is determined through analysis that the verification information does not satisfy the first identity verification-free condition based on the predetermined identity verification rule, performing an identity verification operation on the user based on a predetermined identity verification method.

Further, according to the method in the first aspect of the present disclosure, the feasibility prediction model includes at least one of a long short-term memory (LSTM) model algorithm and a Bayesian model algorithm.

According to a second aspect of the present disclosure, an identity verification apparatus is provided, including the following: an information acquisition module, configured to obtain verification information during a session of a user in response to a verification triggering request; and a condition analysis module, configured to analyze whether the verification information satisfies a first identity verification-free condition based on a predetermined identity verification rule, to determine whether to perform an identity verification-free operation on the user.

Further, according to the apparatus in the second aspect of the present disclosure, the condition analysis module further includes a condition analysis submodule, configured to input the verification information to a feasibility prediction model for calculation, and output indication data indicating whether to perform an identity verification operation on the user; and if it is determined that the verification information satisfies a second identity verification-free condition based on the indication data, perform an identity verification-free operation on the user.

Further, according to the apparatus in the second aspect of the present disclosure, the verification information includes at least one of identity verification record information, environment information of an operating device, and user operation behavior sequence information during the session.

Further, according to the apparatus in the second aspect of the present disclosure, the condition analysis module is specifically configured to analyze whether the verification information hits a not-the-same-person operation condition in the predetermined identity verification rule; and if no, determine that the first identity verification-free condition is satisfied; and analyze whether the verification information hits a high risk operation condition in the predetermined identity verification rule; and if no, determine that the first identity verification-free condition is satisfied.

Further, according to the apparatus in the second aspect of the present disclosure, the information acquisition module is specifically configured to determine whether identity verification has been performed during the session in response to the verification triggering request; and if yes, perform the step of obtaining verification information during a session of a user; or if no, perform an identity verification operation on the user based on a predetermined identity verification method.

Further, according to the apparatus in the second aspect of the present disclosure, the condition analysis module is specifically configured to: if it is determined through analysis that the verification information does not satisfy the first identity verification-free condition based on the predetermined identity verification rule, perform an identity verification operation on the user based on a predetermined identity verification method.

According to a third aspect of the present disclosure, a storage device is further provided, where the storage device stores a computer program instruction, and the computer program instruction is executed according to the method in the first aspect or the second aspect of the present disclosure.

According to a fourth aspect of the present disclosure, a computing device is further provided, including a memory configured to store a computer program instruction and a processor configured to execute the computer program instruction, and the computing device is triggered to perform the method in the first aspect or the second aspect of the present disclosure when the processor executes the computer program instruction.

According to the identity verification method and apparatus provided in the present disclosure, verification information during a session of a user is obtained in response to a verification triggering request; and it is analyzed whether the verification information satisfies a first identity verification-free condition based on a predetermined identity verification rule, to determine whether to perform an identity verification-free operation on the user. In the present disclosure, it is determined whether an identity verification-free operation needs to be performed on a user based on a matching situation between user verification information and a predetermined identity verification-free condition. Therefore, account security can be ensured, and in addition, identity verification operations can be further reduced, and user operation experience can be optimized.

BRIEF DESCRIPTION OF DRAWINGS

Other features, objectives, and advantages of the present disclosure become more clear by reading detailed descriptions of the non-limitative implementations with reference to the following accompanying drawings.

Same or similar reference numerals in the accompanying drawings represent same or similar components.

DESCRIPTION OF IMPLEMENTATIONS

The following further describes the present disclosure in detail with reference to accompanying drawings.

In a typical configuration of the present disclosure, an end-user device and a network serving device each include one or more central processing units (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program apparatus, or other data. A computer storage medium includes but is not limited to a phase-change random access memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device.

Figure 1:
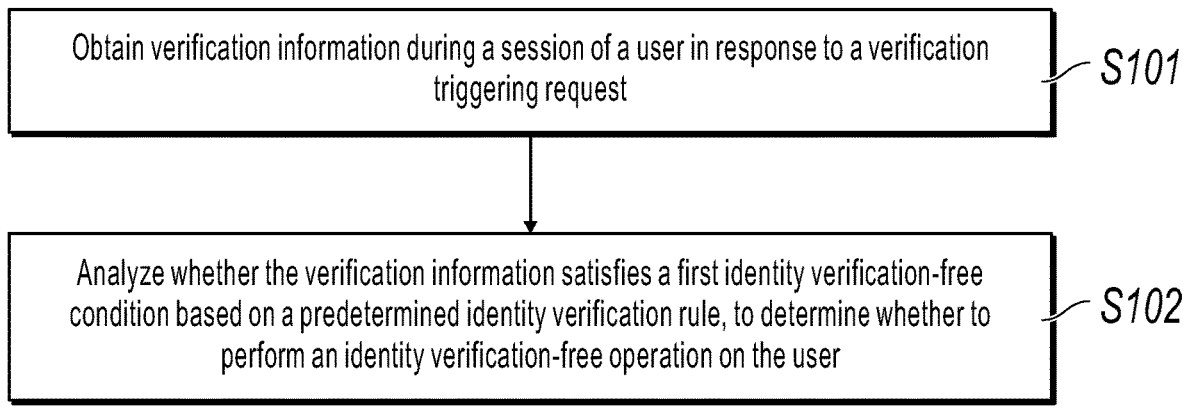
FIG. 1 is a schematic flowchart illustrating an identity verification method, according to Implementation 1 of the present disclosure.

FIG. 1 is a schematic flowchart illustrating an identity verification method, according to Implementation 1 of the present disclosure. As shown in FIG. 1, the identity verification method provided in Implementation 1 of the present disclosure is applied to an identity verification device. The device can be a mobile phone, a pad, a computer, etc. The method includes the following steps.

S101: Obtain verification information during a session of a user in response to a verification triggering request.

The verification triggering request can be a request used to perform an identity verification operation and initiated by operations with a relatively high security level such as user login, password change, binding information change, or payment in the process of using an application component, or initiated when the operation with the relatively high security level is triggered in the process of using the application component. When the verification triggering request is detected, an identity verification mechanism is triggered to obtain the verification information during the session of the user. The verification information includes at least one of identity verification record information, environment information of an operating device, and user operation behavior sequence information during the session. The identity verification record information during the session includes verification information of identity verification of the user after the application component is started, for example, a quantity of verifications. The quantity of verifications can include a quantity of valid verifications (identity verification fails) and a quantity of invalid verifications identity verification succeeds). If the quantity of verifications is greater than 0, the identity verification record information further includes a verification success rate, a degree of matching between identity verification information and previously stored matching information during each verification, etc. The environment information of the operating device includes hardware device information, network device information, location information, etc. of the device currently used by the user. The user operation behavior sequence information includes a sequence of operations on the application component performed by the user, for example, record information of a sequence of operations "1. Open the home page->2. Open "Friend"->3. Transfer from YU'E BAO (money market fund)->4. Verify password" in ALIPAY.

After the verification triggering request is detected, the user identity verification record information during the session can be first obtained, so as to determine whether identity verification has been performed on the user during the session. If yes, it indicates that identity verification has been performed on the user. To avoid frequently performing an identity verification operation on the user within the short time, the verification information during the session of the user can be obtained, so as to further evaluate whether an identity verification-free operation can be performed on the user. If it is determined that identity verification has not been performed on the user or identity verification fails during the session, it indicates that identity verification currently needed is the first identity verification, and an identity verification operation can be performed on the user based on a predetermined identity verification method, in other words, an identity verification operation can be performed on the user based on conventional operations. The predetermined identity verification method can be facial recognition verification, fingerprint verification, password verification, etc.

S102: Analyze whether the verification information satisfies a first identity verification-free condition based on a predetermined identity verification rule, to determine whether to perform an identity verification-free operation on the user.

The predetermined identity verification rule can include multiple matching conditions such as a not-the-same-person operation condition and a high risk operation condition, and it is analyzed whether the verification information hits the not-the-same-person operation condition or the high risk operation condition in the predetermined identity verification rule. If yes, it is determined that the first identity verification-free condition is not satisfied; or if no, it is determined that the first identity verification-free condition is satisfied.

Specifically, the not-the-same-person operation condition or the high risk operation condition can be set based on the identity verification record information, the environment information of the operating device, and the user operation behavior sequence information during the session. Examples are as follows:

I. Evaluate whether the operation is performed by the same person or there is a risk of being performed by a different person based on the quantity of verifications during identity verification of the user, the verification success rate, the degree of matching between the identity verification information and the previously stored matching information during each verification, etc. Examples are as follows:

1. The verification success rate of identity verification during the session is less than a predetermined success rate threshold (e.g., less than the predetermined success rate threshold 80%).

2. During the session, a degree of matching between identity verification information and previously stored matching information during single verification is less than a first predetermined degree of matching (e.g., the first predetermined degree of matching is 98%).

3. Determine, based on the verification record information, that a degree of matching between identity verification information and previously stored matching information during verification in verification failure records is less than a second predetermined degree of matching (e.g., the second predetermined degree of matching is 80%, and the situation indicates that there is a possibility of operating the user device by a different person).

If it is determined that any situation or a specified quantity of situations in the previous situations exist, it can be considered that there is a risk for the current operation, and the high risk operation condition is hit. If at least two situations or a specified quantity of situations in the previous situations exist, it can be considered that the not-the-same-person operation condition is hit.

II. When behavior such as user device change, binding information change, or non-local login is determined based on the hardware device information, the network device information, the location information, etc. of the device currently used by the user, it can be considered that the current operation is a high risk operation, and the high risk operation condition is hit.

III. If it is found, based on the user operation behavior sequence information, that a behavior sequence of the current operation of the user is relatively different from a behavior sequence in a history record, or there is a relatively high risk through analysis based on the behavior sequence of the current operation of the user, it can be considered that the current operation is a high risk operation, and the high risk operation condition is hit.

Matching conditions in the predetermined identity verification rule can be set to any one or more or a specified quantity of the previous content. A user behavior motivation can be further identified by performing scoring on each piece of identity verification information or introducing other identity verification information for comprehensive evaluation. The matching conditions in the predetermined identity verification rule are merely used to further understand the example reference of the present disclosure, and are not used to limit matching conditions in the predetermined identity verification rule in the present disclosure. A specific matching condition can be set by research and development personnel based on an actual application scenario, and is not specifically limited in the present disclosure.

When it is determined that the verification information matches either the not-the-same-person operation condition or the high risk operation condition based on the predetermined identity verification rule, it can be considered that the current operation of the user cannot satisfy the first identity verification-free condition, an identity verification-free operation cannot be performed on the user, and an identity verification operation can be performed on the user based on the predetermined identity verification method, in other words, an identity verification operation can be performed on the user based on conventional operations.

Figure 2:
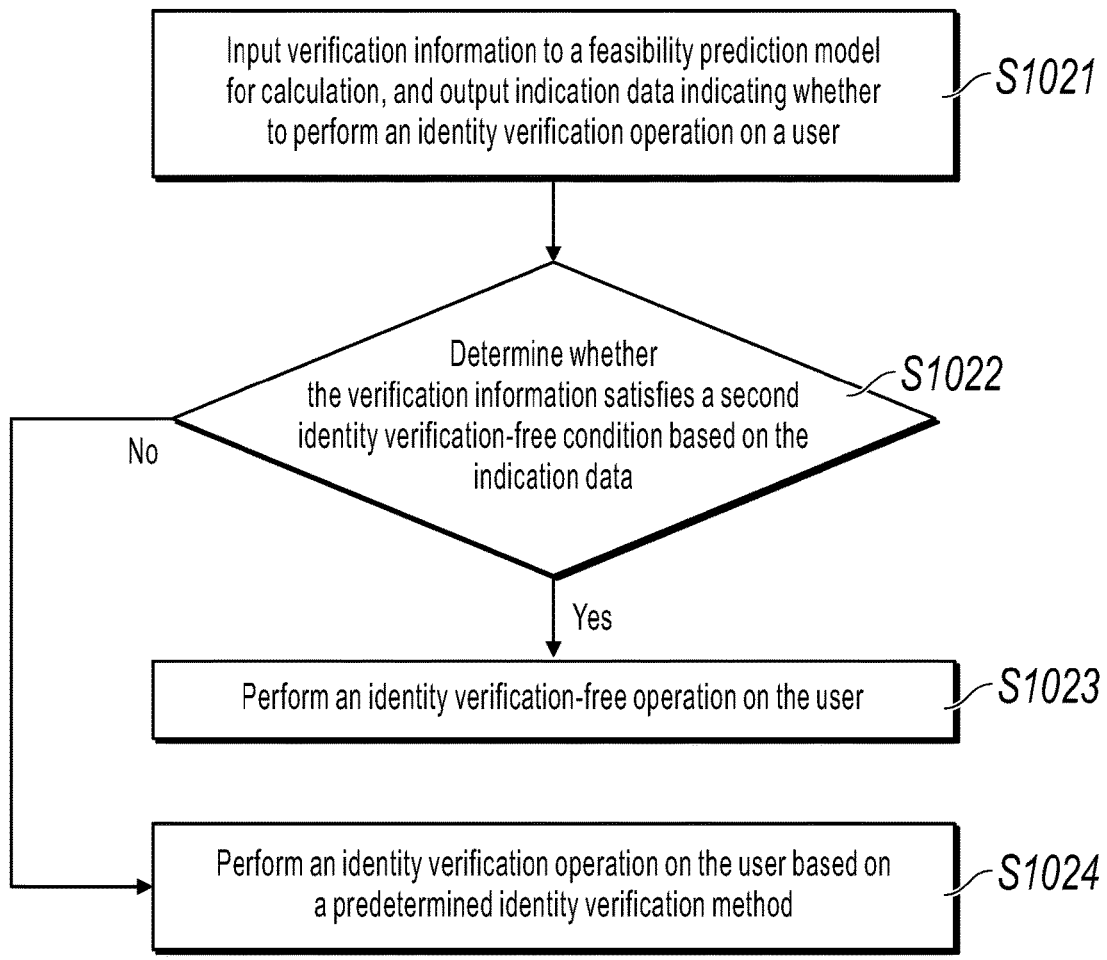
FIG. 2 is a schematic flowchart illustrating an identity verification method, according to Implementation 2 of the present disclosure.

FIG. 2 is a schematic flowchart illustrating an identity verification method, according to Implementation 2 of the present disclosure. As shown in FIG. 2, the identity verification method provided in Implementation 2 of the present disclosure is applied to an identity verification device. The determining whether to perform an identity verification-free operation on the user after it is determined that the verification information satisfies a first identity verification-free condition based on a predetermined identity verification rule further includes the following steps.

S1021: Input the verification information to a feasibility prediction model for calculation, and output indication data indicating whether to perform an identity verification operation on the user.

The feasibility prediction model can be a long short-term memory (LSTM) model algorithm, a Bayesian model algorithm, etc. On the premise of determining that the verification information satisfies the first identity verification-free condition, user operation behavior is evaluated based on a threshold set by the feasibility prediction model and the predetermined identity verification rule, and a result of evaluation is used as a basis for determining whether an identity verification-free operation is to be performed this time, so that user account security is further improved.

During construction of the feasibility prediction model, the identity verification information can be trained as an input model variable, and a corresponding score, a corresponding weighted value, and a threshold that satisfies a second identity verification-free condition are predetermined for the identity verification information.

S1022: Determine whether the verification information satisfies the second identity verification-free condition based on the indication data.

After the current identity verification information of the user is input to the feasibility prediction model, a model identification result of the current operation of the user is obtained through calculation. The model identification result is used to indicate whether to perform an identity verification operation on the user. After it is determined in S102 that the first identity verification-free condition is satisfied, if it is determined that the model identification result is a threshold that satisfies a threshold condition in the second identity verification-free condition, it can be determined that the current user operation is performed by the same person, and S1023 is performed; or if the model identification result is a threshold that does not satisfy the threshold condition in the second identity verification-free condition, it can be considered that there is a relatively high risk currently, and S1024 is performed.

S1023: Perform an identity verification-free operation on the user.

The identity verification-free operation means that an identity verification operation does not need to be performed again after an identity verification operation is performed for the first time during the session of the user, so that identity verification operations of the user are reduced.

S1024: Perform an identity verification operation on the user based on the predetermined identity verification method.

According to the identity verification method provided in the present disclosure, verification information during a session of a user is obtained in response to a verification triggering request; and it is analyzed whether the verification information satisfies a first identity verification-free condition based on a predetermined identity verification rule, to determine whether to perform an identity verification-free operation on the user. In the present disclosure, identity verification operations can be reduced and user operation experience can be optimized while account security is ensured. In addition, the present disclosure is applicable to either a pre-determining condition or a post-determining condition end-to-end in each scenario, so that it is universally used and covers a wide range.

Figure 3:
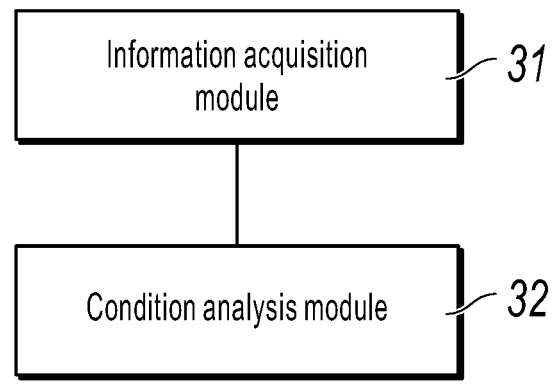
FIG. 3 is a schematic structural diagram illustrating an identity verification apparatus, according to Implementation 3 of the present disclosure.

FIG. 3 is a schematic structural diagram illustrating an identity verification apparatus, according to Implementation 3 of the present disclosure. As shown in FIG. 3, the apparatus includes an information acquisition module 31 and a condition analysis module 32.

The information acquisition module 31 is configured to obtain verification information during a session of a user in response to a verification triggering request.

The condition analysis module 32 is configured to analyze whether the verification information satisfies a first identity verification-free condition based on a predetermined identity verification rule, to determine whether to perform an identity verification-free operation on the user.

The identity verification apparatus in Implementation 3 of the present disclosure is an implementation apparatus of the identity verification method shown in FIG. 1. For details, references can be made to the implementation in FIG. 1. Details are omitted here for simplicity.

Figure 4:
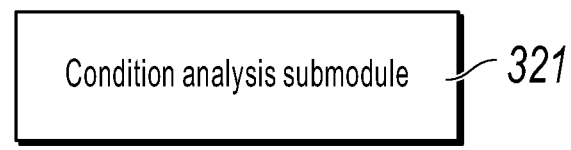
FIG. 4 is a schematic structural diagram illustrating an identity verification apparatus, according to Implementation 4 of the present disclosure.

FIG. 4 is a schematic structural diagram illustrating an identity verification apparatus, according to Implementation 4 of the present disclosure. As shown in FIG. 4, the condition analysis module 32 further includes a condition analysis submodule 321. The condition analysis submodule 321 is specifically configured to input the verification information to a feasibility prediction model for calculation, and output indication data indicating whether to perform an identity verification operation on the user; and if it is determined that the verification information satisfies a second identity verification-free condition based on the indication data, perform an identity verification-free operation on the user.

Further, the verification information includes at least one of identity verification record information, environment information of an operating device, and user operation behavior sequence information during the session.

Further, the condition analysis module 32 is specifically configured to analyze whether the verification information hits a not-the-same-person operation condition in the predetermined identity verification rule, and if no, determine that the first identity verification-free condition is satisfied; and analyze whether the verification information hits a high risk operation condition in the predetermined identity verification rule, and if no, determine that the first identity verification-free condition is satisfied.

Further, the information acquisition module 31 is further configured to determine whether identity verification has been performed during the session in response to the verification triggering request; and if yes, perform the step of obtaining verification information during a session of a user; or if no, perform an identity verification operation on the user based on a predetermined identity verification method.

Further, the condition analysis module 32 is specifically configured to: if it is determined through analysis that the verification information does not satisfy the first identity verification-free condition based on the predetermined identity verification rule, perform an identity verification operation on the user based on a predetermined identity verification method.

The identity verification apparatus in Implementation 4 of the present disclosure is an implementation apparatus of the identity verification method shown in FIG. 2. For details, references can be made to the implementation in FIG. 2. Details are omitted here for simplicity.

An implementation of the present disclosure further provides a storage device. The storage device stores a computer program instruction, and the computer program instruction is executed according to the methods shown in FIG. 1 and FIG. 2 of the present disclosure.

An implementation of the present disclosure further provides a computing device. The computing device includes a memory configured to store a computer program instruction and a processor configured to execute the computer program instruction, and the computing device is triggered to perform the methods shown in FIG. 1 and FIG. 2 of the present disclosure when the processor executes the computer program instruction.

In addition, some implementations of the present disclosure further provide a computer readable medium, where the computer readable medium stores a computer program instruction, and the computer readable instruction can be executed by a processor to implement at least one of the method and the technical solution in the multiple implementations of the present disclosure described above.

It is worthwhile to note that the present disclosure can be implemented in software and/or a combination of software and hardware. For example, the present disclosure can be implemented by using an application-specific integrated circuit (ASIC), a general purpose computer, or any other similar hardware device. In some implementations, a software program in the present disclosure can be executed by a processor, so as to implement the previously described steps or functions. Similarly, the software program (including a related data structure) in the present disclosure can be stored in a computer readable recording medium, for example, a RAM, a hard disk drive or a DVD-ROM/CD-ROM drive, or a floppy disk and a similar device. In addition, some steps or functions of the present disclosure can be implemented by using hardware, for example, a circuit that cooperates with the processor to perform the steps or the functions.

It is clear to a person skilled in the art that the present disclosure is not limited to the details of the previous example implementations, and the present disclosure can be implemented in another specific form without departing from the spirit or essential feature of the present disclosure. Therefore, the implementations should be considered as illustrative and not restrictive in every aspect, and the scope of the present disclosure is limited by the appended claims, rather than the above description. Therefore, the present disclosure covers all changes within the meaning and the scope of the equivalent elements of the claims. Any reference numeral in the claims should not be considered as a limitation on the related claim. In addition, it is clear that the word "include" does not exclude another unit or step, and the singular does not exclude the plural. Multiple units or apparatuses described in the apparatus claims can be implemented by one unit or apparatus by using software or hardware. The words such as "first" and "second" are used to indicate names instead of any particular order.

What is claimed is:

1. A computer-implemented method, comprising:
obtaining verification information during a user session of a user with an application subsequent to a verification triggering request to perform identity verification on the user, wherein the verification information comprises (i) a success rate of previous identity verification processes performed to verify an identity of the user during the user session, (ii) a degree of match between user identity information provided by the user for at least one of the previous identity verification processes and previously stored user identity information for the user, or (iii) a combination of (i) and (ii);
determining whether the verification information satisfies a first identity verification-free condition, wherein determining whether the verification information satisfies the first identity verification-free condition comprises providing the verification information as input to a feasibility prediction model and receiving, as an output of the feasibility prediction model, a result indicating whether the verification information satisfies the first identity verification-free condition;
when the verification information satisfies the first identity verification-free condition, performing an identity verification-free operation that does not include an additional identity verification process to verify the identity of the user, or
when the verification information fails to satisfy the first identity verification-free condition, performing the additional identity verification process to verify the identity of the user.

2. The computer-implemented method of claim 1, wherein the verification information further comprises (iv) identity verification record specifying one or more previous identity verifications performed for the user during the user session, (v) environment information comprising hardware device information of an operating device used by the user during the user session or location information of the operating device, (vi) user operation behavior sequence specifying a sequence of operations performed by the user while using the application during the user session, or any combination of (iv), (v), and (vi).

3. The computer-implemented method of claim 1, wherein determining whether the verification information satisfies the first identity verification-free condition comprises at least one of:
determining that the verification information does not satisfy a not-the-same-person operation condition in an identity verification rule; or
determining that the verification information does not satisfy a high risk operation condition in the identity verification rule.

4. The computer-implemented method of claim 1, further comprising determining that at least one previous identity verification process has been previously performed for the user during the user session in response to the verification triggering request, wherein the verification information is obtained in response to determining that the at least one previous identity verification process has been performed for the user during the user session.

5. The computer-implemented method of claim 1, wherein the feasibility prediction model comprises a long short-term memory (LSTM) model algorithm, a Bayesian model algorithm, or a combination of the LSTM model algorithm and the Bayesian model algorithm.

6. The computer-implemented method of claim 1, further comprising:
detecting an operation having at least a specified security level during the user session of the user with the application; and
generating the verification triggering request in response to detecting that the operation has at least the specified security level.

7. The computer-implemented method of claim 1, wherein determining whether the verification information satisfies a first identity verification-free condition comprises determining whether the verification information satisfies a threshold set by the feasibility prediction model.

8. The computer-implemented method of claim 7, further comprising generating the feasibility prediction model by determining a score, a weighted value, and the threshold using second identity verification as an input model variable.

9. A non-transitory, computer-readable medium storing one or more instructions executable by a computer system to perform operations comprising:

obtaining verification information during a user session of a user with an application subsequent to a verification triggering request to perform identity verification on the user, wherein the verification information comprises (i) a success rate of previous identity verification processes performed to verify an identity of the user during the user session, (ii) a degree of match between user identity information provided by the user for at least one of the previous identity verification processes and previously stored user identity information for the user, or (iii) a combination of (i) and (ii);

determining whether the verification information satisfies a first identity verification-free condition, wherein determining whether the verification information satisfies the first identity verification-free condition comprises providing the verification information as input to a feasibility prediction model and receiving, as an output of the feasibility prediction model, a result indicating whether the verification information satisfies the first identity verification-free condition;

when the verification information satisfies the first identity verification-free condition, performing an identity verification-free operation that does not include an additional identity verification process to verify the identity of the user, or when the verification information fails to satisfy the first identity verification-free condition, performing the additional identity verification process to verify the identity of the user.

10. The non-transitory, computer-readable medium of claim 9, wherein the verification information further comprises (iv) identity verification record specifying one or more previous identity verifications performed for the user during the user session, (v) environment information comprising hardware device information of an operating device used by the user during the user session or location information of the operating device, (vi) user operation behavior sequence specifying a sequence of operations performed by the user while using the application during the user session, or any combination of (iv), (v), and (vi).

11. The non-transitory, computer-readable medium of claim 9, wherein determining whether the verification information satisfies the first identity verification-free condition comprises at least one of:
  determining that the verification information does not satisfy a not-the-same-person operation condition in an identity verification rule; or
  determining that the verification information does not satisfy a high risk operation condition in the identity verification rule.

12. The non-transitory, computer-readable medium of claim 9, wherein the operations comprise determining that at least one previous identity verification process has been previously performed for the user during the user session in response to the verification triggering request, wherein the verification information is obtained in response to determining that the at least one previous identify verification process has been performed for the user during the user session.

13. The non-transitory, computer-readable medium of claim 9, wherein the feasibility prediction model comprises a long short-term memory (LSTM) model algorithm, a Bayesian model algorithm, or a combination of the LSTM model algorithm and the Bayesian model algorithm.

14. The non-transitory, computer-readable medium of claim 9, wherein the operations comprise:

detecting an operation having at least a specified security level during the user session of the user with the application; and
generating the verification triggering request in response to detecting that the operation has at least the specified security level.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  obtaining verification information during a user session of a user with an application subsequent to a verification triggering request to perform identity verification on the user, wherein the verification information comprises (i) a success rate of previous identity verification processes performed to verify an identity of the user during the user session, (ii) a degree of match between user identity information provided by the user for at least one of the previous identity verification processes and previously stored user identity information for the user, or (iii) a combination of (i) and (ii);
  determining whether the verification information satisfies a first identity verification-free condition, wherein determining whether the verification information satisfies the first identity verification-free condition comprises providing the verification information as input to a feasibility prediction model and receiving, as an output of the feasibility prediction model, a result indicating whether the verification information satisfies the first identity verification-free condition;
  when the verification information satisfies the first identity verification-free condition, performing an identity verification-free operation that does not include an additional identity verification process to verify the identity of the user, or
  when the verification information fails to satisfy the first identity verification-free condition, performing the additional identity verification process to verify the identity of the user.

16. The computer-implemented system of claim 15, wherein the verification information further comprises (iv) identity verification record specifying one or more previous identity verifications performed for the user during the user session, (v) environment information comprising hardware device information of an operating device used by the user during the user session or location information of the operating device, (vi) user operation behavior sequence specifying a sequence of operations performed by the user while using the application during the user session, or any combination of (iv), (v), and (vi).

17. The computer-implemented system of claim 15, wherein determining whether the verification information satisfies the first identity verification-free condition comprises at least one of:
  determining that the verification information does not satisfy a not-the-same-person operation condition in an identity verification rule; or
  determining that the verification information does not satisfy a high risk operation condition in the identity verification rule.

18. The computer-implemented system of claim 15, wherein the operations comprise determining that at least one previous identity verification process has been previously performed for the user during the user session in response to the verification triggering request, wherein the verification information is obtained in response to determining that the at least one previous identify verification process has been performed for the user during the user session.

19. The computer-implemented system of claim 15, wherein the feasibility prediction model comprises a long short-term memory (LSTM) model algorithm, a Bayesian model algorithm, or a combination of the LSTM model algorithm and the Bayesian model algorithm.

20. The computer-implemented system of claim 15, wherein the operations comprise:
  detecting an operation having at least a specified security level during the user session of the user with the application; and
  generating the verification triggering request in response to detecting that the operation has at least the specified security level.

* * * * *